(12) United States Patent
Parazynski

(10) Patent No.: US 9,888,701 B2
(45) Date of Patent: Feb. 13, 2018

(54) TEA BREWING CONTAINMENT DEVICE AND METHOD OF USING SAME

(71) Applicant: Scott Edward Parazynski, Houston, TX (US)

(72) Inventor: Scott Edward Parazynski, Houston, TX (US)

( * ) Notice: Subject to any disclaimer, the term of this patent is extended or adjusted under 35 U.S.C. 154(b) by 266 days.

(21) Appl. No.: 14/930,503

(22) Filed: Nov. 2, 2015

(65) Prior Publication Data

US 2016/0135638 A1    May 19, 2016

Related U.S. Application Data

(60) Provisional application No. 62/080,350, filed on Nov. 16, 2014.

(51) Int. Cl.
*A47J 31/38* (2006.01)
*A23F 3/18* (2006.01)
*A47J 31/18* (2006.01)
*A47G 19/16* (2006.01)

(52) U.S. Cl.
CPC ............... *A23F 3/18* (2013.01); *A47G 19/16* (2013.01); *A47J 31/18* (2013.01)

(58) Field of Classification Search
CPC ............ A23F 3/18; A47G 19/16; A47J 31/18
See application file for complete search history.

(56) References Cited

U.S. PATENT DOCUMENTS

| 2,678,000 | A | * | 5/1954 | Scheidt | A47G 19/16 100/110 |
| 2,708,401 | A | | 5/1955 | Leclerc et al. | |
| 2,887,948 | A | | 5/1959 | Kramer et al. | |
| 3,342,518 | A | | 9/1967 | Gorton, Jr. | |
| 5,031,517 | A | * | 7/1991 | Yeh | A47J 31/20 99/319 |
| 5,335,591 | A | | 8/1994 | Pozar | |
| 9,089,232 | B1 | | 7/2015 | Parazynski | |
| 2005/0183579 | A1 | * | 8/2005 | Bowers | A47G 21/106 99/279 |

* cited by examiner

*Primary Examiner* — Anthony Weier
(74) *Attorney, Agent, or Firm* — Steven H Greenfield; Greenfield Invention and Patent Consulting, Inc.

(57) ABSTRACT

A device and method for preparing a cup of tea from a tea bag or tea leaves, for reusing the tea bag or tea leaves, and for handling and containing the spent tea bag or leaves is described. The device is configured to remotely dip a tea bag or tea leaves into a hot cup of water, retrieve the tea bag or tea leaves after dipping, and apply pressure onto the spent tea bag or tea leaves to squeeze out undiffused flavor. The device is additionally configured to encapsulate the spent tea bag or tea leaves to prevent undesirable drippings from the tea bag or tea leaves that could scald the user's skin, and to obscure from view the unattractive, damp, and used tea materials.

10 Claims, 6 Drawing Sheets

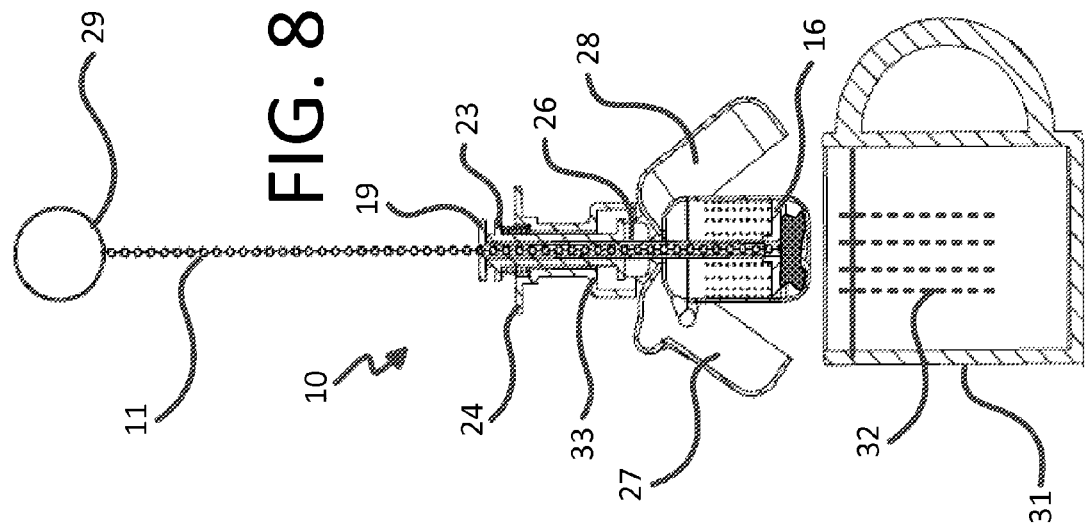
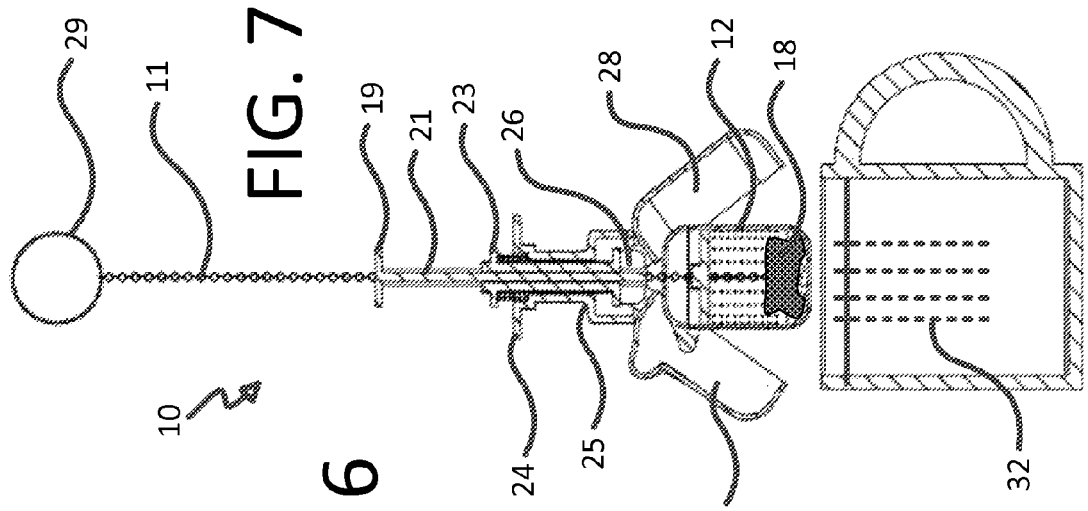
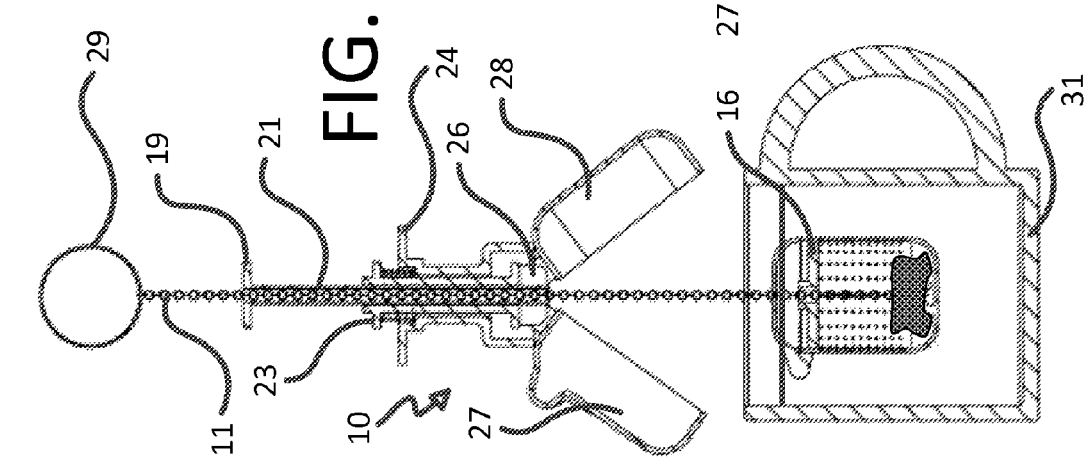

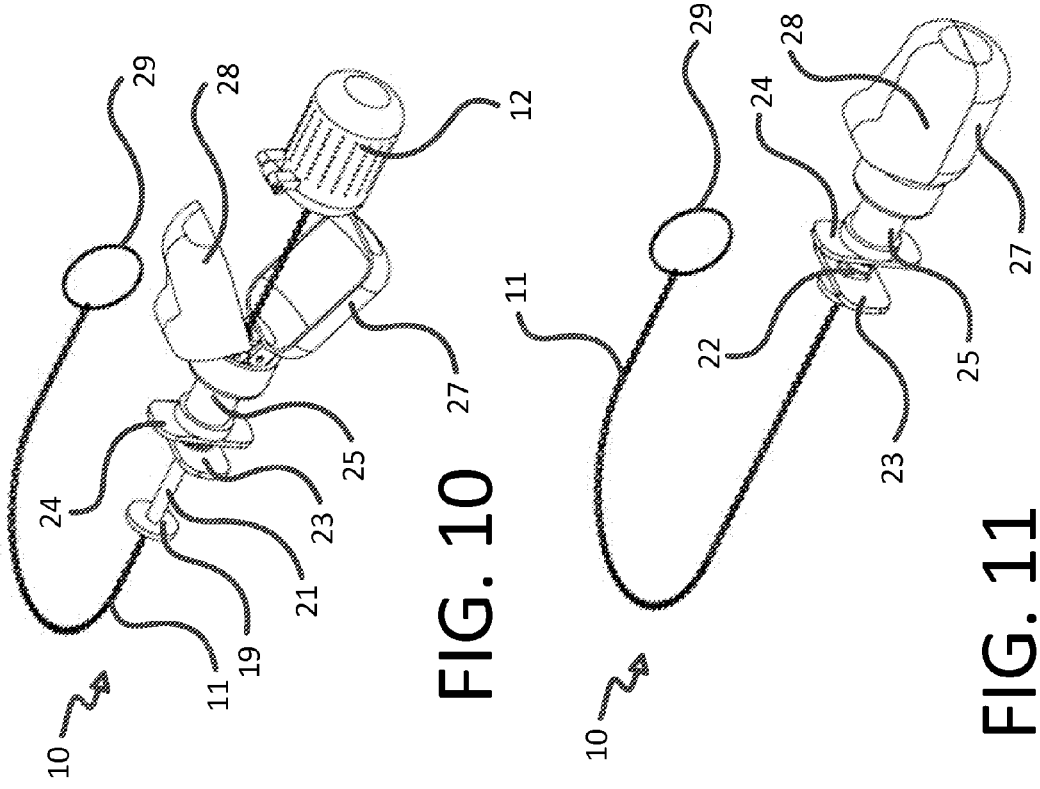
FIG. 10
FIG. 11
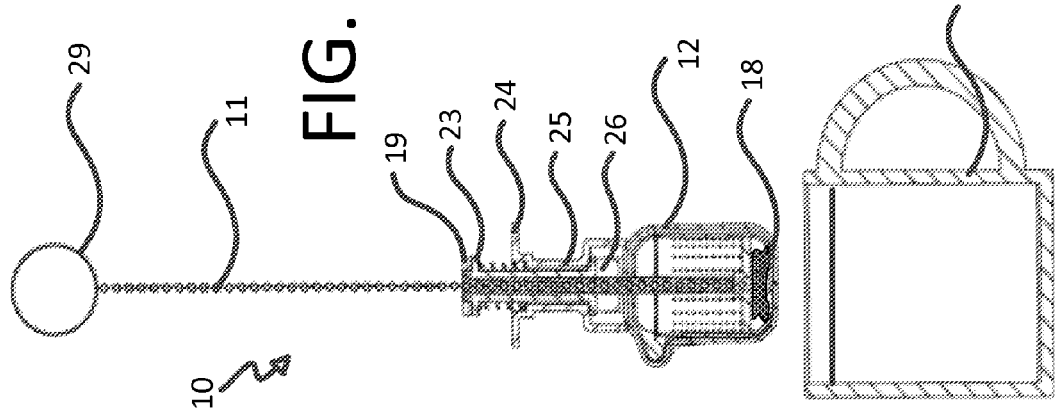
FIG. 9

SECTION G-G

TEA BREWING CONTAINMENT DEVICE AND METHOD OF USING SAME

RELATED APPLICATIONS

This application claims priority from provisional application No. 62/080,350 filed on Nov. 16, 2014.

FIELD OF THE INVENTION

The present invention relates to a device for aiding in the preparation of a cup, mug or pot of tea, handling the spent tea bag or tea leaves that result from preparing tea, and containing the drippings that emanate from the spent tea bag or tea leaves after the cup, mug or pot of tea is made.

BACKGROUND OF THE INVENTION

A cup, mug or pot of tea is typically made by dipping a porous tea bag or tea ball infuser into a hot reservoir of water for several seconds to several minutes in order to release the tea flavor from the tea bag or tea ball infuser into the hot water. The tea is then removed from the hot water. Removing the tea in whatever form can be a messy process as the tea bag or tea ball infuser tends to drip and may even inadvertently sink to the bottom of the cup, mug or tea pot. Moreover, drippings can scald the skin, stain the tablecloth and/or create a pool of tea in a saucer, which might then drip on and stain one's clothing or tablecloth. Other disadvantages with the common method of preparing a cup of tea include the length of time needed to achieve an optimal flavor and the singular and thus potentially wasteful use of tea bags. Similar issues arise when a cup, mug or pot of tea is prepared from tea leaves. To prevent the undesirable mess resulting from disposing of the used tea leaves, multiple dishes need to be typically used in a time consuming process. Moreover, the damp tea bag or tea infuser, once removed from the cup, mug or tea pot, is unattractive and detracts from the tea brewing experience.

The present invention addresses all these negatives. The device used for preparing a large mug or pot of tea from tea leaves or one or more tea bags is a single unit device that provides for functionalities and features to 1) prevent the tea bag or tea leaves contained in a ball from sinking to the bottom so that its retrieval would not require reaching into the hot water reservoir with ones' fingers or a spoon, 2) prevent dripping outside the brewing reservoir when the device is removed, 3) shorten the time to squeeze out the flavor from the tea bag into the water and obviate the need for wrapping the tea bag around a spoon or other secondary utensil to squeeze the tea bag before removing from the cup of tea, 4) enable reusing a tea bag or tea leaves at least once, and 5) obscure from view the unattractive, damp, and used tea bag or tea leaves following brewing.

A number of prior art references that relate to tea bag holding and squeezing devices. In U.S. Pat. No. 5,335,591, two porous plates are attached to the ends of a tong. U.S. Pat. No. 2,887,948 likewise discloses two dome shaped porous plates connected to a common hinge. References that indicate at least one porous plate include U.S. Pat. No. 3,342,518 and U.S. Pat. No. 2,708,401. U.S. Pat. No. 9,089,232 teaches devices and methods to contain a tea bag or tea leaves in the course of the preparation of a cup of tea. The device holds in place the tea bag or tea leaves while immersed in hot water, provides for pressure onto the tea bag or tea leaves and provides for a plate or bowl to contain any dripping due to the removal of the bag or tea leaves from the cup. The devices utilized in U.S. Pat. No. 9,089,232 are different than that of the present invention, but generally accomplish a similar result.

SUMMARY OF THE PRESENT INVENTION

In one aspect of the present invention, a tea brewing containment device comprises a tea brewing containment device for remotely manipulating a hot tea bag or leaves in the course of preparing a cup of tea, the device comprising: a porous container for tea leaves or a tea bag; a line attached to an inside portion of the container; a first piston being enclosed within a second piston, the second piston being enclosed within a walled enclosure, the line being threaded through the first piston, the line being adapted for movement inside the first piston, the first piston being adapted for upward and downward movement within the second piston, the second piston being adapted for upward and downward movement within the walled enclosure; a first encasing jaw and a second encasing jaw, the first and second container encasing jaws being configured to fully encase the container in a manner as to prevent liquid from escaping out from the container, the first and second container encasing jaws being pivotally attached to a bottom portion of the walled enclosure, the first and second encasing jaws being configured for pivoting sideways; an encasing jaws actuator attached to a bottom portion of the second piston, wherein an upward movement of the encasing jaws actuator being constrained by an inner wall member of the walled enclosure, the encasing jaws actuator having a center opening for threading through the first piston and the line contained within the first piston; and wherein downward movement of the encasing jaws actuator is configured for pivoting the encasing jaws to the sides and the upward movement of the encasing jaws actuator is configured for inwardly pivoting the container encasing jaws and for encasing the container.

In another aspect of the present invention, a method for preparing a cup of tea comprises: providing a tea brewing containment device; placing a tea bag or tea leaves inside the porous container and placing the cap over the container; with the jaws being pivoted to the sides, placing the tea brewing containment device over a cup containing hot water; lowering the container into the cup such that the tea bag or tea leaves are exposed to the hot water, the lowering being accomplished by a downward movement of the line; soaking the tea bag or leaves for a predetermined period of time to impart flavor to the water; exerting an upward movement to the line to lift the container above the cup and allowing liquid from the container to drip into the cup through the holes in the container walls; and while holding the tea brewing containment device in place, exerting an upward movement onto the line causing the upward movement of the container, consequently causing upward pressure onto the encasing jaws actuator, the inward pivoting of the container encasing jaws, and the encasing jaws to encase the container.

These and other features, aspects and advantages of the present invention will become better understood with reference to the following drawings, description and claims.

BRIEF DESCRIPTION OF THE DRAWINGS

FIGS. 6, 7, 8 and 9 portray the assembled tea brewing containment device of the present invention being used in the course of preparing a cup of tea;

FIGS. 10 and 11 are perspective views of the assembled tea brewing containment device shown in different configurations according to an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to a device for containing, manipulating and handling a tea bag or loose leaf tea that is configured to control the flavor transferred to hot water in a quick and efficient manner while preventing potentially messy and scalding liquid drippings from contacting the skin or the outside of the tea cup, mug or pot as the tea bag or tea infuser is removed. Moreover, the device allows for the reuse of tea, as desired, while obscuring the view of unattractive damp tea as well as the spent tea bag or brewed tea leaves.

Drawings 1-13 illustrate the tea brewing containment device that may be used for making cups of tea from both tea leaves and tea bags.

The device is an assembly comprising of three mechanisms configured to work, in tandem, sequentially and remotely from a hot cup of water: 1) a mechanism for lowering into a hot reservoir of water a porous container that houses a tea bag or tea leaves, infusing tea flavor into the water, then retrieving the container from the reservoir, 2) applying pressure onto a spent tea bag or spent tea leaves to squeeze out undiffused flavor, and 3) a mechanism for encapsulating the container to prevent undesirable drippings from the tea bag or tea leaves.

Figure 1:
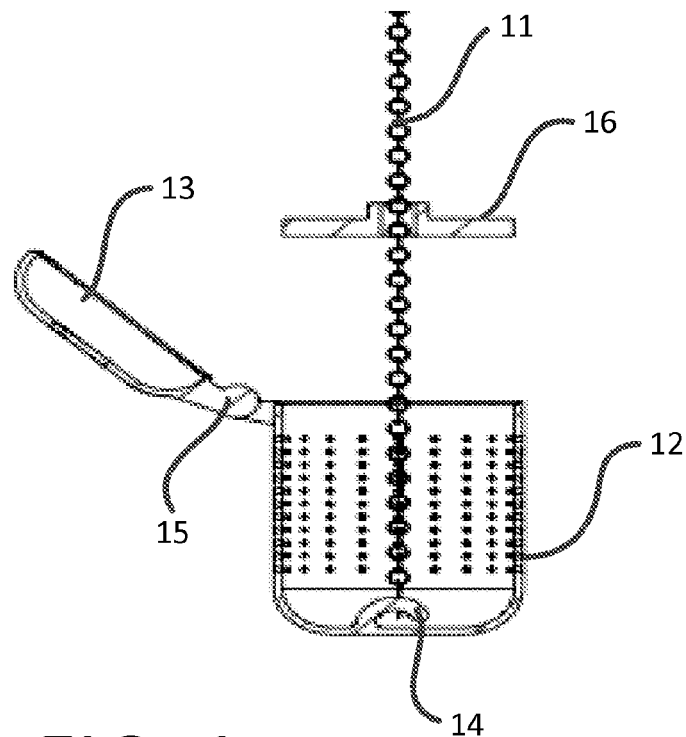
FIGS. 1, 2 and 3 are side sectional views of one component of a tea brewing containment device shown in different configurations according to an embodiment of the present invention.
Figure 2:
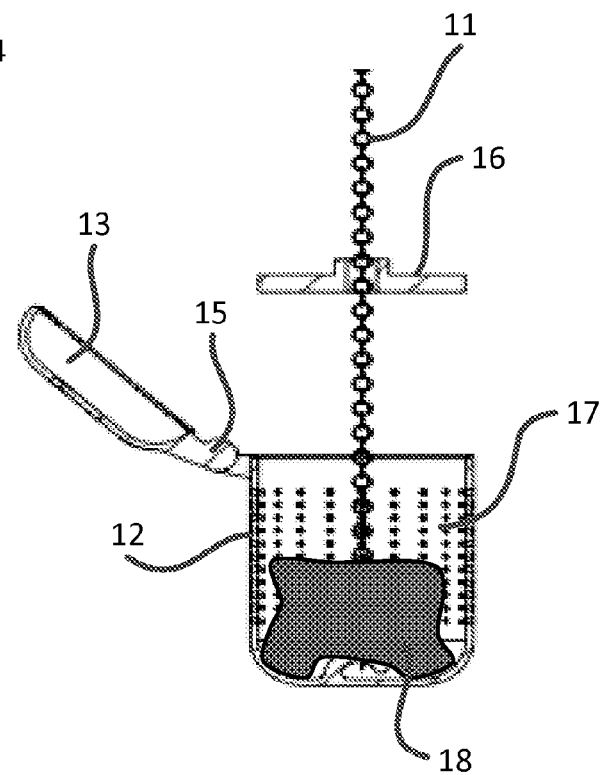
Figure 3:
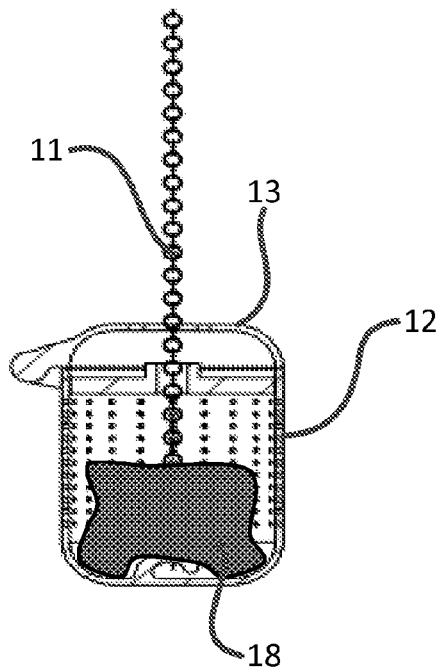

FIGS. 1-3 portray a porous container or infuser 12 having a plurality of holes 17. Cap 13 is adapted to fit onto and cover the top of the container 12 and pivot in and out of covering the top of the container 12 through hinge 15. FIG. 2 shows the open container position while FIG. 3 shows the closed container position.

A line such as a chain or string 11 is connected at its lower end to a hook 14 at the bottom of the container 12. The line 11 is threaded through the center of compression plate 16 configured to slide upward or downward inside the container 12 and reach to or near the bottom of the container 12. A slit through the cap 13 allows the chain 11 to thread through the center of the cap 13 when the cap 13 covers the container 12.

Tea leaves 18 are shown inside the container 12 in FIG. 2; however it is noted that tea bags also fall within the scope of the present invention as the source of the tea essence. The cap 13 is pivoted over and onto the top of the container 12 after the tea bag or tea leaves 18 are placed inside the container 12.

Figure 4:
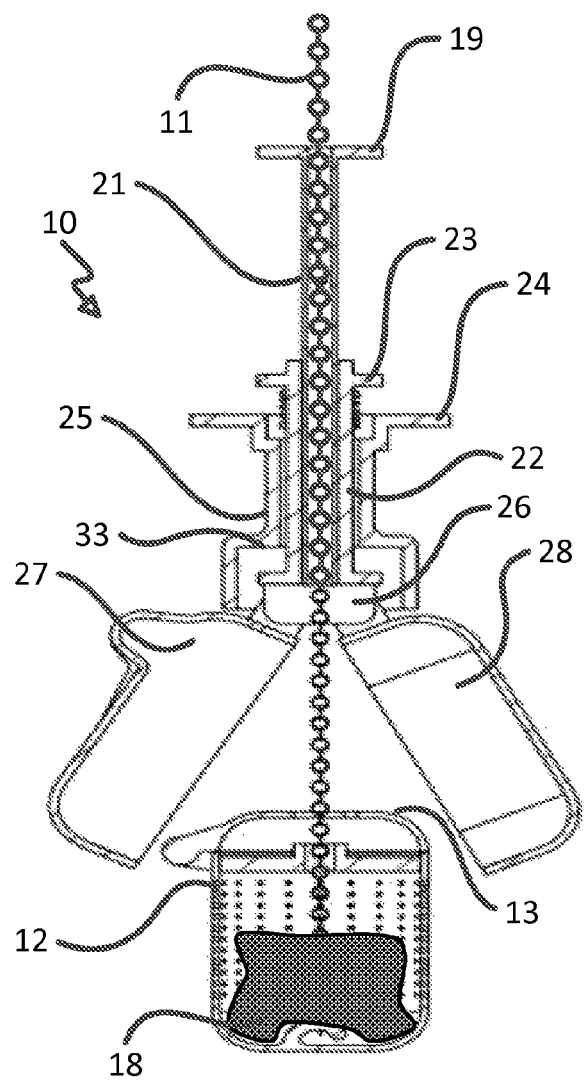
FIGS. 4 and 5 are side sectional views of the assembled tea brewing containment device shown in different configurations according to an embodiment of the present invention.
Figure 5:
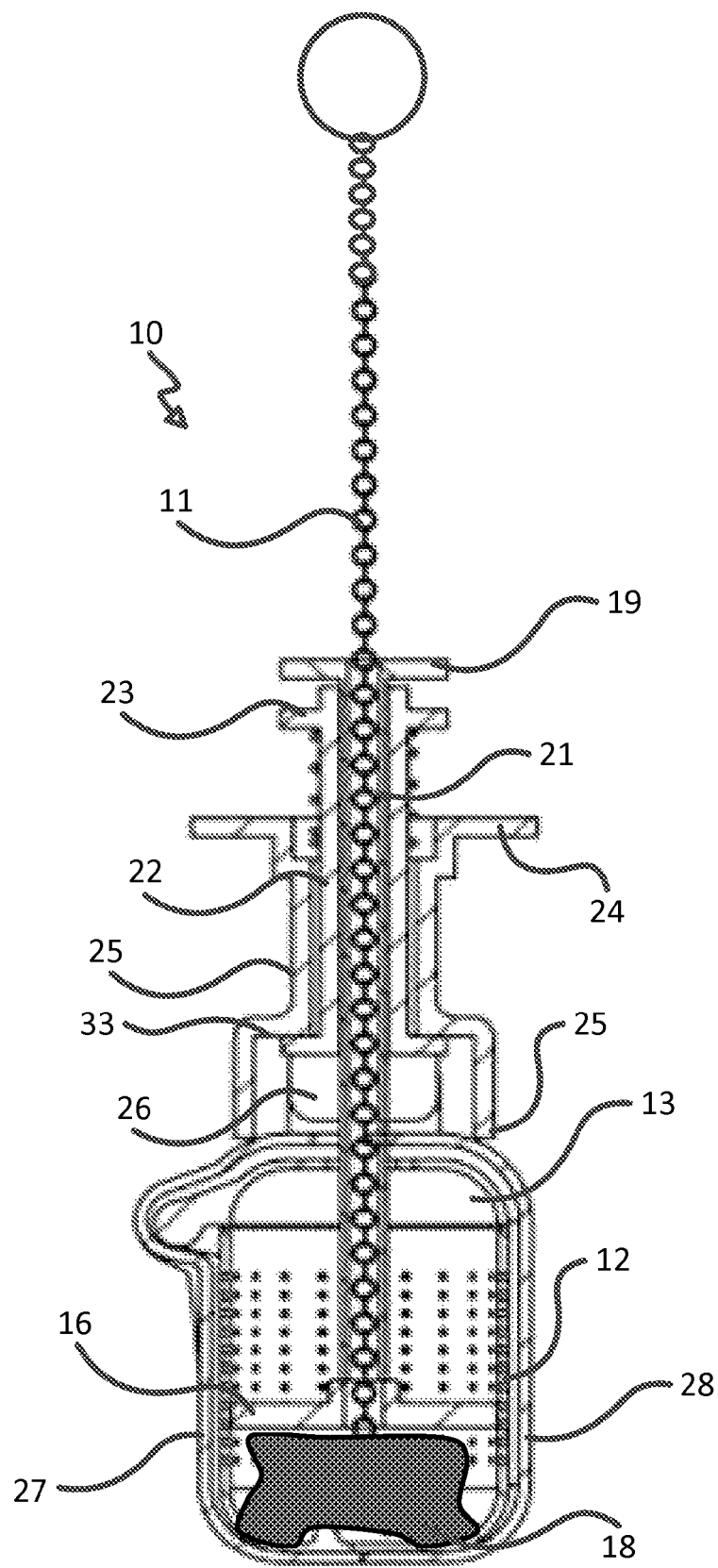
Figure 13:
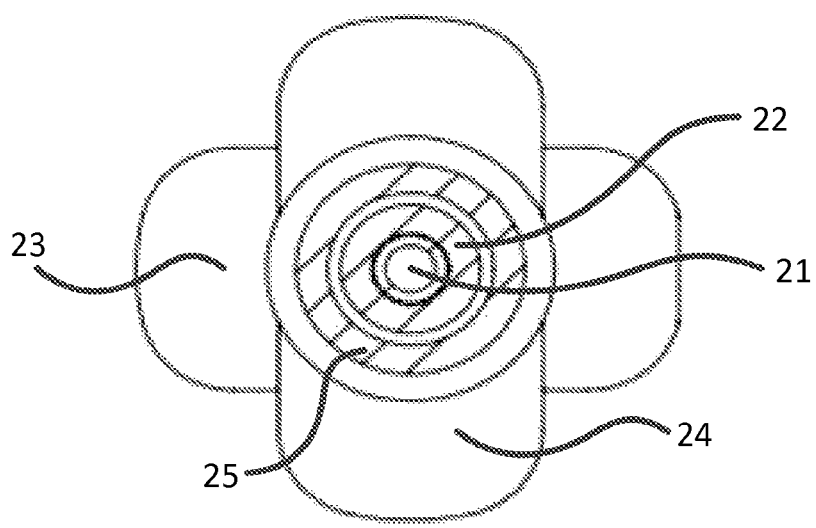
FIG. 13 is a top view of the assembled tea brewing containment device according to an embodiment of the present invention.
Figure 12:
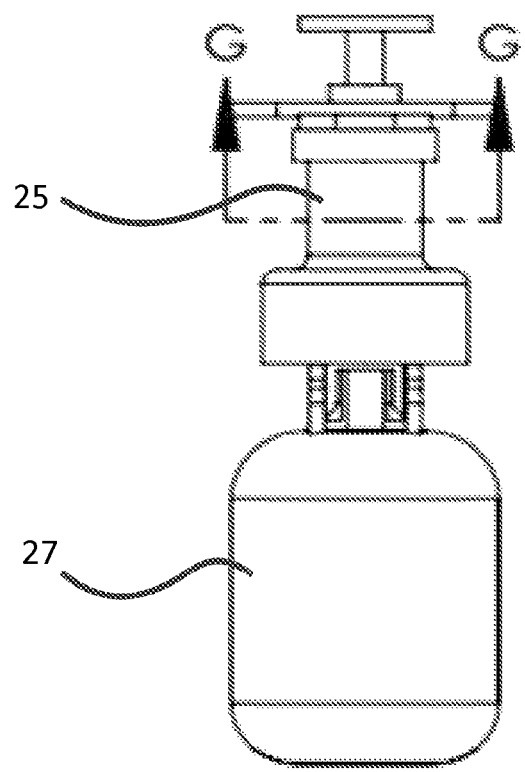
FIG. 12 is a side view of the assembled tea brewing containment device according to an embodiment of the present invention.

The handling mechanism 10 of the container 12 described in FIGS. 4 and 5 comprises of a first piston 21 contained within a second piston 22. The second piston 22 is encased within the outer walls 25 of the device 10. A handle 19 is attached to the top of the first piston 21 for the user to grip onto and move the first piston 21 up or down. Likewise, a handle 23 is attached to the top of the second piston 22. Another handle 24 is attached to the top of the outer wall 25 and a ring 29 is attached to the top of the chain 11. Handle 24 may be used for holding onto the device with one hand as needed in the course of its use.

The container 12 is adapted for encasement inside a first encasing jaw 27 and a second encasing jaw 28 configured for pivoting sideways in a manner as to allow the container 12 to move in between the encasing jaws 27 and 28. Attached to the bottom of the second piston 22 is encasing jaws actuator 26 to which the top of each encasing jaw 27 and 28 is attached. The upward movement of the encasing jaws actuator 26 is constrained by inner wall extension 33. The downward and upward movement of the encasing jaws actuator 26 may be controlled by the user by pressing or lifting the second piston handle 23. When the second piston 22 is pressed downward, the pressure of the encasing jaws actuator 26 onto the first and second jaws 27 and 28 respectively causes the jaws to pivot sideways. When the second piston 22 is moved upward, the jaws pivot inwardly and re-enclose onto the container 12. FIG. 4 shows the encasing jaws 27 and 28 pivoted to the sides while FIG. 5 shows the jaws encasing the container 12. FIGS. 4 and 5 also indicate a second way to move the encasing jaws actuator 26 upward and that is by pulling the chain 11 upward such the container cover 13 pushes up on encasing jaws actuator 26.

In the configuration of FIG. 4, the first piston handle 19 is in its uppermost position. In FIG. 5 it is in its lowest position. As the first piston handle 19 is pressed downward, the first piston 21 penetrates through the center of the encasing jaws actuator 26 and the container cover 13 reaching the top center of the compression plate 16. Continuing pressure on the compression plate 16 pushes the compression plate 16 to the bottom of the container 12 where it presses onto the tea bag or tea leaves 18.

The first step to the preparation of the cup of tea is shown in FIG. 6. The device 10 is held above the cup 31 filled with hot water. The container 12 is covered with cap 13 and the chain 11 is threaded through the inside of the first piston 21, through the encasing jaws actuator 26, through the container cover 13, and through the compression plate 16 reaching the bottom of the container 12 where it is attached to hook, 14 shown in FIG. 1. The first piston handle 19 is in its uppermost position, the second piston handle 23 in its lowest position, jaws 27 and 28 are pivoted sideways and container 12 is not encased and thus free to move upward or downward.

The user, holding the device by the ring 29 with one hand and the handle 24 with the other to hold the device in a fixed position, lowers the container 12 holding the tea bag or tea leaves 18 into the cup 31 that is filled with hot water by allowing chain 11 to move downward. In this configuration, the tea bag or leaves 18 are exposed to the hot water through holes 17 in the container 12, the encasing jaws actuator 26 is at its lowest position and the jaws 27 and 28 are pivoted sideways.

After a specific soak time to allow flavor leaching from the tea bag or leaves 18 into the water, the chain 11 is pulled upward along with the container 12 resulting in the container 12 clearing the cup 31. Drippings 32 from the soaked tea bags or leaves fall into the cup 31 through the holes of the container 12 as shown in FIG. 7.

In the next step, while gripping onto the ring 29, the user presses downward onto the first piston handle 19 which results in the first piston 21 pressing onto the compression plate 16 and moving it toward the bottom of the container 12 causing the compression of the tea bag or tea leaves 18. This results in the squeezing of flavor out of the spent tea bag or tea leaves 18 into the cup 31 for a stronger cup of tea as shown in FIG. 8 and would typically be completed before the jaws 27 and 28 encase the container 12. It is noted that this step is optional and depends on whether or not the user desires to enrich the cup of tea with more flavor.

In the last step shown in FIG. 9, the chain 11 is pulled upward to its uppermost position such that the container 12 presses upward onto the jaws actuator 26 causing the jaws 27 and 28 to encase the container 12. Any additional dripping from the inside of the container 12 will thus be prevented from falling out. Alternatively, handle 23 may be pulled upward causing the jaws actuator 26 to be lifted which enables the pivoting of jaws 27 and 28 to encase the container 12.

It should be understood, of course, that the foregoing relates to exemplary embodiments of the invention and that modifications may be made without departing from the spirit and scope of the invention.

I claim:

1. A tea brewing containment device for remotely manipulating a hot tea bag or leaves in the course of preparing a cup of tea, said device comprising:
   a porous container for infusing tea leaves or a tea bag;
   a line attached to an inside portion of the container;
   a first piston being enclosed within a second piston, said second piston being enclosed within a walled enclosure, said line being threaded through the first piston, said line being adapted for movement inside the first piston, said first piston being adapted for upward and downward movement within the second piston, said second piston being adapted for upward and downward movement within the walled enclosure;
   a first encasing jaw and a second encasing jaw, said first and second container encasing jaws being configured to fully encase said container in a manner as to prevent liquid from escaping out from the container, said first and second container encasing jaws being pivotally attached to a bottom portion of the walled enclosure, said first and second encasing jaws being configured for pivoting sideways;
   an encasing jaws actuator attached to a bottom portion of the second piston, wherein an upward movement of said encasing jaws actuator being constrained by an inner wall member of the walled enclosure, said encasing jaws actuator having a center opening for threading through the first piston and the line contained within the first piston; and
   wherein downward movement of the encasing jaws actuator is configured for pivoting the encasing jaws to the sides and the upward movement of the encasing jaws actuator is configured for inwardly pivoting the container encasing jaws and for encasing the container.

2. The tea brewing containment device of claim 1, further comprising a handle disposed at a top portion of the first piston.

3. The tea brewing containment device of claim 1, further comprising a handle disposed at a top portion of the second piston.

4. The tea brewing containment device of claim 1, further comprising a handle disposed at a top portion of the walled enclosure.

5. The tea brewing containment device of claim 1, further comprising a compression plate adapted for movement inside the container, said compression plate having a center opening, said line being threaded through the center opening of the compression plate.

6. The tea brewing containment device of claim 1, further comprising a cap adapted for covering the porous container, said cap having a center opening, said first piston containing the line being configured for threading through said center opening of the cap.

7. The tea brewing containment device of claim 1, further comprising a hinge member attached to the inner wall member configured for pivoting the encasing jaws.

8. The tea brewing containment device of claim 1, further comprising a ring for holding the line, said ring being attached to a top side of the line.

9. A method for preparing a cup of tea using the tea brewing containment device said method comprising:
   providing a tea brewing containment device comprising:
      a porous container for tea leaves or a tea bag; a line attached to an inside portion of the container; a first piston being enclosed within a second piston, said second piston being enclosed within a walled enclosure, said line being threaded through the first piston, said line being adapted for movement inside the first piston, said first piston being adapted for upward and downward movement within the second piston, said second piston being adapted for upward and downward movement within the walled enclosure; a first container encasing jaw and a second encasing jaw, said first and second container encasing jaws being configured to fully encase said container in a manner as to prevent liquid from escaping out from the container, said first and second container encasing jaws being pivotally attached to a bottom portion of the walled enclosure, said first and second encasing jaws being configured for pivoting sideways; an encasing jaws actuator attached to a bottom portion of the second piston, wherein an upward movement of said encasing jaws actuator being constrained by an inner wall member of the walled enclosure, said encasing jaws actuator having a center opening for threading through the first piston and the line contained within the first piston, wherein downward movement of the encasing jaws actuator is configured for pivoting the encasing jaws to the sides and the upward movement of the encasing jaws actuator is configured for inwardly pivoting the container encasing jaws and for encasing the container; a compression plate adapted for movement inside the container, said compression plate having a center opening, said line being threaded through the center opening of the compression plate; and a cap adapted for covering the porous container, said cap having a center opening, said first piston containing the line being threaded through said center opening of the cap;
   placing a tea bag or tea leaves inside the porous container and placing the cap over the container;
   with the jaws being pivoted to the sides, placing the tea brewing containment device over a cup containing hot water;
   lowering the container into the cup such that the tea bag or tea leaves are exposed to the hot water, said lowering being accomplished by a downward controlled movement of the line;

soaking the tea bag or leaves for a predetermined period of time to impart flavor to the water;

exerting an upward movement onto the line to lift the container above the cup and allowing liquid from the container to drip into the cup through holes in the container walls; and while holding the tea brewing containment device in place, exerting an upward movement onto the line causing the upward movement of the container, consequently causing upward pressure onto the encasing jaws actuator, the inward pivoting of the container encasing jaws and the encasing jaws to encase the container.

10. The method of claim 9 further comprising exerting a downward movement onto the first piston such that a bottom portion of said first piston presses down onto the compression plate, said compression plate exerting pressure onto the tea bag or leaves to press out tea flavored liquid, said tea flavor dripping into the cup.

\* \* \* \* \*